(12) United States Patent
Hsu et al.

(10) Patent No.: US 11,221,605 B2
(45) Date of Patent: Jan. 11, 2022

(54) INTELLIGENT FAN CONTROL SYSTEM WITH INTERFACE COMPATIBILITY

(71) Applicant: PROLIFIC TECHNOLOGY INC., Taipei (TW)

(72) Inventors: Chia Chang Hsu, Taipei (TW); Chih Feng Huang, Taipei (TW); Ching-Te Chen, Taipei (TW); Ren-Yuan Yu, Taipei (TW)

(73) Assignee: PROLIFIC TECHNOLOGY INC., Taipei (TW)

( * ) Notice: Subject to any disclaimer, the term of this patent is extended or adjusted under 35 U.S.C. 154(b) by 160 days.

(21) Appl. No.: 16/796,072

(22) Filed: Feb. 20, 2020

(65) Prior Publication Data

US 2020/0264575 A1    Aug. 20, 2020

(30) Foreign Application Priority Data

Feb. 20, 2019   (TW) .................................. 108105576

(51) Int. Cl.
*G05B 19/042* (2006.01)
*F04D 25/08* (2006.01)
*G05D 13/62* (2006.01)

(52) U.S. Cl.
CPC .. *G05B 19/042* (2013.01); *G05B 2219/25257* (2013.01)

(58) Field of Classification Search
CPC ........ G05B 19/042; G05B 2219/25257; F04D 25/08; F04D 27/004; G05D 13/62; H03K 7/08

USPC .......................................................... 700/282
See application file for complete search history.

(56) References Cited

U.S. PATENT DOCUMENTS

| 7,199,542 B1 * | 4/2007 | Chen ....................... G05B 11/28 318/473 |
| 9,188,355 B1 * | 11/2015 | Allen ........................ F24F 11/77 |
| 2009/0162039 A1 * | 6/2009 | Zou .......................... G06F 1/206 388/811 |
| 2009/0208192 A1 * | 8/2009 | Xi .......................... F04D 27/004 388/819 |
| 2019/0011475 A1 * | 1/2019 | Wu ............................ G01P 3/49 |
| 2019/0045660 A1 * | 2/2019 | Hsu ............................ G06F 1/20 |

* cited by examiner

*Primary Examiner* — Michael J Brown
(74) *Attorney, Agent, or Firm* — Muncy, Geissler, Olds & Lowe, P C.

(57) ABSTRACT

An intelligent fan control system with interface compatibility is provided. The intelligent fan control system can identify and control fans one-to-one connected to fan slots, and each fan slot includes four pins. The intelligent fan control system includes a bus; an I2C signal switching unit including SDA outputs one-to-one connected to third pin of the fan slots via the bus; an I2C signal switching unit including SCL outputs one-to-one connected to fourth pins of the fan slots via the bus; voltage control units one-to-one corresponding to the fan slots, and having output terminals one-to-one connected to second pins of the fan slots; connection line sets, and each connection line set including four connection lines and connected to the corresponding fan slot; a control board comprising port sets, and can control and switch the I2C signal switching unit to the fan slots in sequence, to transmit the corresponding I2C signal.

25 Claims, 7 Drawing Sheets

INTELLIGENT FAN CONTROL SYSTEM WITH INTERFACE COMPATIBILITY

BACKGROUND OF THE INVENTION

1. Field of the Invention

The present invention relates to a fan, and more particularly to an intelligent fan control system with interface compatibility.

2. Description of the Related Art

Generally, conventional cooling fans can be classified into three-wire fans and four-wire fans. The four-wire fan has a pin defined as a PWM speed control pin. A control board on a motherboard can adjust a PWM duty cycle according to a detected temperature or system requirement, so as to control a fan speed, thereby achieving the purpose of adjusting the temperature.

The PWM duty cycle may be not linearly proportional to the fan speed during fan speed control operation, and when synchronous control of multiple fans and constant fan speed are required, the fan control scheme becomes complicated. For this reason, the demand for intelligent fans with control boards is gradually increasing. The motherboard can directly send commands for the required functions, such as constant speed, constant temperature, PWM duty, stop, or forward/reverse, to the intelligent fan via a communication interface, and the intelligent fan can self-adjust a fan status thereof according to the system requirements. The motherboard can also obtain the current information of the fan operation via the communication interface, for example, the information can include an instant rotation speed, power consumption, or an abnormal condition. Therefore, the motherboard can obtain a characteristic curve, a production traceability and a lifespan of the intelligent fan.

The conventional intelligent fan usually uses a four-wire fan provided with a PWM communication interface or an I2C communication interface. Each of the fan with the PWM communication interface and the fan with the I2C communication interface has four pins, but these two fans are very different.

If the user does not know the interface format of the fan on the existing motherboard, the interface incompatibility problem may occur when the user replaces the fan. For example, when the communication interface on the motherboard is a 4-wire I2C type but the user installs a PWM fan or a three-wire fan accidentally, the compatibility problem occurs; when the communication interface on the motherboard is a 4-wire PWM type, but the user installs an I2C fan or a three-wire fan accidentally, the compatibility problem also occurs.

Therefore, how to develop an intelligent fan control system with interface compatibility, to enable the three-wire fan, the four-wire PWM fan or the four-wire I2C fan can be inserted into the same fan slot of the motherboard, is a key issue for the motherboard manufacturer.

SUMMARY OF THE INVENTION

An objective of the present invention is to provide an intelligent fan control system with interface compatibility, and the intelligent fan control system can use a voltage control unit to convert a PWM control signal into an output voltage required for a three-wire fan, and use the manner of selecting an I2C signal and the PWM control signal to perform test to define a type of each fan, so that single motherboard can be compatible with all types of fans, thereby achieving a technical effect of easy installation and simple maintenance for a fan; furthermore, a user does not need to set any information of fan, and the motherboard can perform self-maintenance without particularly setting any software. As a result, the intelligent fan control system of the present invention can be very convenient and effective for the user and the motherboard manufacturer.

According to an embodiment, the present invention provides an intelligent fan control system with interface compatibility. The intelligent fan control system can identify and control a plurality of fans connected to a plurality of fan slots, and each of the plurality of fan slots includes four pins. The intelligent fan control system includes a bus, an I2C signal switching unit, a plurality of voltage control units, a plurality of connection line sets, and a control board. The I2C signal switching unit includes a plurality of SDA outputs one-to-one connected to third pins of the plurality of fan slots via the bus, and a plurality of SCL outputs one-to-one connected to fourth pins of the plurality of fan slots via the bus. The plurality of voltage control units one-to-one correspond to the plurality of fan slots. An output terminal of each of the plurality of voltage control units is connected to a second pin of one of the plurality of fan slots corresponding thereto. Each of the plurality of connection line sets comprises four connection lines and connected to one of the plurality of fan slots corresponding thereto, and each of the plurality of connection line sets comprises a second line connected to an input terminal of one of the plurality of voltage controlled units corresponding thereto, and a fourth line connected to one of the plurality of voltage control units corresponding thereto. The control board includes a plurality of port sets. Each of the plurality of port sets includes four pins and is connected to one of the plurality of connection line set corresponding thereto and one of the plurality of voltage control units corresponding thereto. The control board is connected to the I2C signal switching unit and configured to transmit an I2C signal to control the I2C signal switching unit to switch to one of the plurality of fan slots via the bus in a sequential order, and the control board then transmits an I2C signal to the one of plurality of fan slots to which the I2C signal switching unit is switched. The control board controls the plurality of fans according to a fan type record table stored in a memory, and when one of the plurality of fans is a three-wire fan, the control board enables the corresponding one of the plurality of voltage control units and transmits a PWM control signal generated by the control board, via the fourth line of the corresponding connection line set, to control an output voltage of the corresponding voltage control unit, so as to adjust a rotation speed of the three-wire fan.

According to an embodiment, the present invention provides an intelligent fan control system with interface compatibility. The intelligent fan control system can identify and control a plurality of fans connected to a plurality of fan slots, and each of the plurality of fan slots includes the four pins. The intelligent fan control system includes a bus, an I2C signal switching unit, a plurality of connection line sets, and a control board. The I2C signal switching unit includes a plurality of SDA outputs one-to-one connected to third pins of the plurality of fan slots via the bus, and a plurality of SCL outputs one-to-one connected to fourth pins of the plurality of fan slots via the bus. Each of the plurality of connection line sets includes four connection lines and connected to one of the plurality of fan slots corresponding thereto. The control board includes a plurality of port sets.

Each of the plurality of port sets includes four pins and connected to one of the plurality of connection line sets corresponding thereto, and one of the plurality of fan slot sets corresponding thereto. The control board is connected to the I2C signal switching unit and configured to transmit an I2C signal to control the I2C signal switching unit to switch to one of the plurality of fan slots in a sequential order via the bus, and then the control board transmits an I2C signal to the one of plurality of fan slots to which the I2C signal switching unit is switched. The control board can control the plurality of fans according to a fan type record table stored in a memory.

According to an embodiment, the present invention provides an intelligent fan control system with interface compatibility. The intelligent fan control system can identify and control a plurality of fans connected to a plurality of fan slots, and each of the plurality of fan slots includes four pins. The intelligent fan control system includes a plurality of connection line sets and a control board. Each of the plurality of connection line sets includes four connection lines and connected to one of the plurality of fan slots corresponding thereto. The control board includes a microcontroller, at least one I2C unit, at least one PWM control signal generating unit, and a plurality of port sets. Each of the plurality of port sets includes four pins and is connected to one of the plurality of connection line set corresponding thereto and one of the plurality of voltage control units corresponding thereto, and the control board defines a third pin of each of the plurality of port sets as SDA/FG, and defines a fourth pin of each of the plurality of port sets as SCL/PWM, and the control board controls operations of the at least one I2C unit and the at least one PWM control signal generating unit according to a fan type testing method and a fan type record table, so as to switch an I/O status of each of the plurality of port sets to an I2C control mode or a PWM control mode. When one of the plurality of port sets is in the I2C control mode, the control board switches the third pin and the fourth pin of the one of the plurality of port sets to be SDA and SCL, respectively, and blocks input/output of the at least one PWM control signal generating unit to the fourth pin of the one of the plurality of port sets. When one of the plurality of port sets is in the PWM control mode, the control board switches the third pin and the four pin of the one of the plurality of port sets to be FG and PWM, and blocks input/output of the at least one I2C unit to the third pin and the fourth pin of the one of the plurality of port sets. The fan type record table is stored in the memory and configured to record whether each of the plurality of fans is a PWM fan or an I2C fan.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
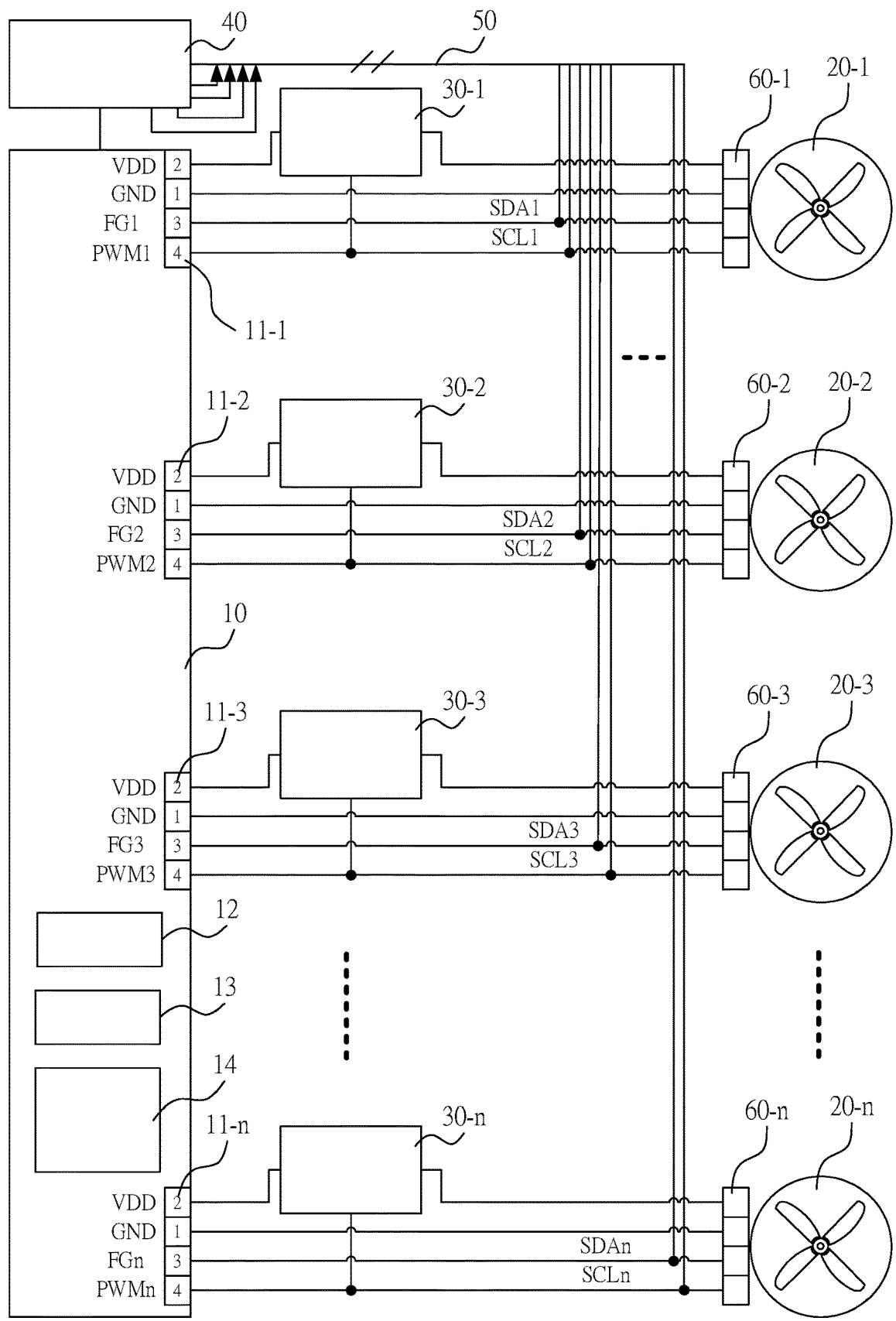
FIG. 1 is a functional block diagram of an intelligent fan control system with interface compatibility, according to an embodiment of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

The intelligent fan control system with interface compatibility provided by the present invention can use a voltage control unit to convert a PWM control signal into an output voltage required for a three-wire fan, and can use the manner of selecting an I2C signal and a PWM control signal to perform test, to define the type of each fan, so that single motherboard can be compatible with all types of fans, thereby achieving the technical effect of easy installation and simple maintenance for fan. Furthermore, a user does not need to set any information of the fan, and the motherboard can perform self-maintenance without particularly setting any software. As a result, the intelligent fan control system of the present can be very convenient and effective for the user and the motherboard manufacturer.

Please refer to FIG. 1, which is a structural diagram of an intelligent fan control system with interface compatibility, according to an embodiment of the present invention. The intelligent fan control system is able to identify and control a plurality of fans (20-1, 20-2, 20-3 . . . 20-n) connected to a plurality of fan slots (60-1, 60-2, 60-3 . . . 60-n), and each of the plurality of fan slots can include four pins. The intelligent fan control system can include a bus 50, a plurality of connection line sets, an I2C signal switching unit 40, a plurality of voltage control units (30-1, 30-2, 30-3, . . . 30-n), and a control board 10. The I2C signal switching unit 40 can include a plurality of SDA outputs (SDA1, SDA2, SDA3 . . . SDAn) one-to-one connected to third pins of the plurality of fan slots (60-1, 60-2, 60-3 . . . 60-n) via the bus 50. The I2C signal switching unit 40 can include a plurality of SCL outputs (SCL1, SCL2, SCL3 . . . SCLn) one-to-one connected to fourth pins of the plurality of the fan slots (60-1, 60-2, 60-3 . . . 60-n) via the bus 50. The plurality of voltage control units (30-1, 30-2, 30-3, . . . 30-n) one-to-one correspond to the plurality of fan slots (60-1, 60-2, 60-3 . . . 60-n), and each of the voltage control units has an output terminal connected to a second pin of the fan slot corresponding thereto.

Each of the plurality of connection line sets can include four connection lines, and the plurality of connection line sets are one-to-one connected to the plurality of fan slots (60-1, 60-2, 60-3 . . . 60-n). Each connection line set has a second line connected to an input terminal of one of the voltage control units (30-1, 30-2, 30-3, . . . 30-n) corresponding thereto, and a fourth line connected to one of the voltage control units corresponding thereto. In an embodiment, the bus 50 and the plurality of connection line sets can be manufactured by different manners such as cables or circuit boards. The control board 10 includes a plurality of port sets (11-1, 11-2, 11-3 . . . 11-n). Each of the plurality of port sets can include four pins, such as VDD, GND, SDA1/FG1 and SCL1/PWM1 of the port set 11-1 shown in FIG. 1. The plurality of port sets are one-to-one connected to the plurality of connection line sets, the plurality of voltage control units, and the plurality of fan slot sets. According to the pins VDD, GND, SDA1/FG1 and SCL1/PWM1 of the port set 11-1 shown in FIG. 1, the second pin VDD of the port set 11-1 is electrically connected to the input terminal of the voltage control unit 30-1 via a connection line, and the output terminal of the voltage control unit 30-1 is electrically connected to the fan slot 60-1 via a connection line, and the fourth pin SCL1/PWM of the port set 11-1 is electrically connected to the voltage control unit 30-1. In a condition that the fan 20-1 is a three-wire fan, the control board 10 can control a level of the voltage outputted by the voltage control unit 30-1 to the second pin of the fan slot 60-1 via the fourth line SCL1/PWM of the port set 11-1, so as to control a rotation speed of the fan 20-1.

Furthermore, the control board 10 is connected to the I2C signal switching unit 40, and configured to transmit an I2C signal to control and switch the I2C signal switching unit 40 to the corresponding one of the fan slots (60-1, 60-2, 60-3 . . . 60-n) via the bus 50 in a sequential order, and after the I2C signal switching unit 40 is switched, the control board 10 transmits the corresponding I2C signal. As shown in FIG. 1, the I2C signal switching unit 40 can connect a plurality of SDA outputs (SDA1, SDA2, SDA3, . . . SDAn) and a plurality of SCL outputs (SCL1, SCL2, SCL3 . . . SCLn) to the fan slots (60-1, 60-2, 60-3 . . . 60-n), respectively, via the bus 50. After the control board 10 transmits the I2C signal to the I2C signal switching unit 40, and controls and switches the I2C signal switching unit 40 to the corresponding fan slots, such as one of the fan slots (60-1, 60-2, 60-3 . . . 60-n), the control board 10 can transmit the I2C signal to the corresponding fan slot (such as one of the fan slots 60-1, 60-2, 60-3 . . . 60-n) via the bus 50, so that the corresponding fan (such as one of the fans 20-1, 20-2, 20-3 . . . 20-n) can receive the I2C signal. By the above-mentioned multiplex switching manner, the control board 10 can output the corresponding I2C signals to the corresponding fans, in sequence.

The PWM control signal can be directly transmitted via the fourth pins (SCL1/PWM1, SCL2/PWM2, SCL3/PWM3 . . . SCLn/PWMn) of the port sets (11-1, 11-2, 11-3 . . . 11-n), and fourth pins of fan slots (60-1, 60-2, 60-3 . . . 60-n) can receive the PWM control signal, and transmit the PWM control signal to the fans (20-1, 20-2, 20-3 . . . 20-n), respectively.

The memory 12 can store a fan type record table which records types of the fans (20-1, 20-2, 20-3 . . . 20-n). The intelligent fan control system of the present invention defines four fan types including absence of fan, a three-wire fan, a PWM fan, and an I2C fan. The memory 12 can be disposed in the control board 10, or the outside of the control board. The control board 10 can include at least one microcontroller configured to execute all operations. The control board 10 can include at least one I2C unit 13 and at least one PWM control signal generating unit 14, and the two units can be integrated into the microcontroller. The fan type record table records the types of the fans (20-1, 20-2, 20-3, . . . 20-n), and a fan type testing method can be applied to determine the types of the fans, so that the control board 10 can control operations of the voltage control units, the I2C signal switching unit 40, and the PWM control signal generating unit 14 and the I2C unit 13, according to different types of the fans, thereby adequately controlling the different types of fans.

In an embodiment, when the fan is the PWM fan or the I2C fan, the control board 10 disables the voltage control unit.

When the fan is the PWM fan, the control board 10 blocks the outputs of the I2C signal switching unit 40 to the third pin and the fourth pin of the PWM fan, and enables the output of PWM control signal to the fourth pin of the PWM fan. For example, when the fan 20-2 is the PWM fan, the control board 10 blocks the outputs (SDA2, SCL2) of the I2C signal switching unit 40 to the third pin and the fourth pin of the fan 20-2, and enables to output the PWM control signal, via the pin PWM2 of the port set 11-2, to the fourth pin of the fan 20-2. After the above-mentioned setting is completed, the control board 10 generates and outputs signal via the pin PWM2 only to the fourth pin of the port set 11-2 for the fan 20-2, and does not output the I2C signals, via the pins (SDA2, SCL2), to the third pin and the fourth pin of the port set 11-2. The speed value of the fan 20-2 can be transmitted back to the control board 10 via the third pin FG2 of the port set 11-2. Furthermore, since the voltage control unit 30-2 is disabled, the output signal of the second pin VDD of the port set 11-2 is at a normal level, so a voltage drop does not occur. According to above operations, the control scheme of the PWM fan can be established.

When the fan is the I2C fan, the control board 10 blocks the output of the at least one PWM control signal to the fourth pin of the fan, and enables the I2C signal switching unit 40 to output signals to the third pin and the fourth pin of the fan. For example, when the fan 20-3 is the I2C fan, the control board 10 blocks the output of the PWM control signal generating unit 14 to the fourth pin of the fan 20-3 (that is, the pin PWM3 is blocked), and enables the I2C signal switching unit 40 to output signal to the third pin and the fourth pin (SDA3, SCL3) of the fan 20-3. After the above-mentioned setting is completed, the control board 10 generates the I2C signals only to the third pin and fourth pin of the port set 11-3 for the fan 20-3, and does not output the PWM control signal, via the pin PWM3, to the fourth pin of the port set 11-3. Furthermore, since the voltage control unit 30-3 is disabled, the output signal on the second pin VDD of the port set 11-3 is at a normal level, so a voltage drop does not occur. According to above operations, the control scheme of the I2C fan can be established.

When the fan is the three-wire fan, the control board 10 enables the voltage control unit, and blocks the output of the I2C signal switching unit 40 to the third pin and the fourth pin of the fan, and enables the output of the PWM control signal to the fourth pin of the fan. For example, when the fan 20-1 is the three-wire fan, the control board 10 enables the voltage control unit 30-1, and blocks the outputs of the I2C signal switching unit 40, via the pins SDA1 and SCL1, to the third pin and the fourth pin of the fan 20-1, and enables the output of the PWM control signal, via the pin PWM1 of the port set 11-1, to the fourth pin of the fan 20-1. After the above-mentioned setting is completed, the control board 10 generates and outputs PWM control signal only, via the pin PWM1, to the fourth pin of the port set 11-1 for fan 20-1, and does not output the I2C signals, via the pins SDA1 and SCL1, to the third pin and the fourth pin of the port set 11-1. Since the voltage control unit 30-1 is enabled, the PWM control signal can be transmitted to the voltage control unit 30-1 via the fourth pin PWM1 of the port set 11-1, to generate and adjust the outputted VDD voltage, so as to change the VDD voltage inputted to the second pin of the fan slot 60-1, and regulate the rotation speed of the fan 20-1. The speed value of the fan 20-1 can be transmitted back to the control board 10 via the third pin FG1 of the port set 11-1. According to above operations, the control scheme of the three-wire fan can be established.

When there is no fan connected to the control board 10, the control board 10 disables the voltage control unit, blocks the outputs of the I2C signal switching unit 40 to the third pin and the fourth pin of the fan, and disables the output of the PWM control signal to the fourth pin of the fan. In other words, the control board 10 stops all operations of controlling the fan.

According to above-mentioned content, after the types of all fans are determined, the intelligent fan control system with interface compatibility of the present invention can automatically change the control scheme for different fan. In other words, the intelligent fan control system with interface compatibility of the present invention can use the same circuit architecture to control different four types of fans.

The fan type testing method of the intelligent fan control system with interface compatibility of the present invention will be described in following paragraphs. The fan type testing method can be executed to determine the type of the fan.

Figure 2A:
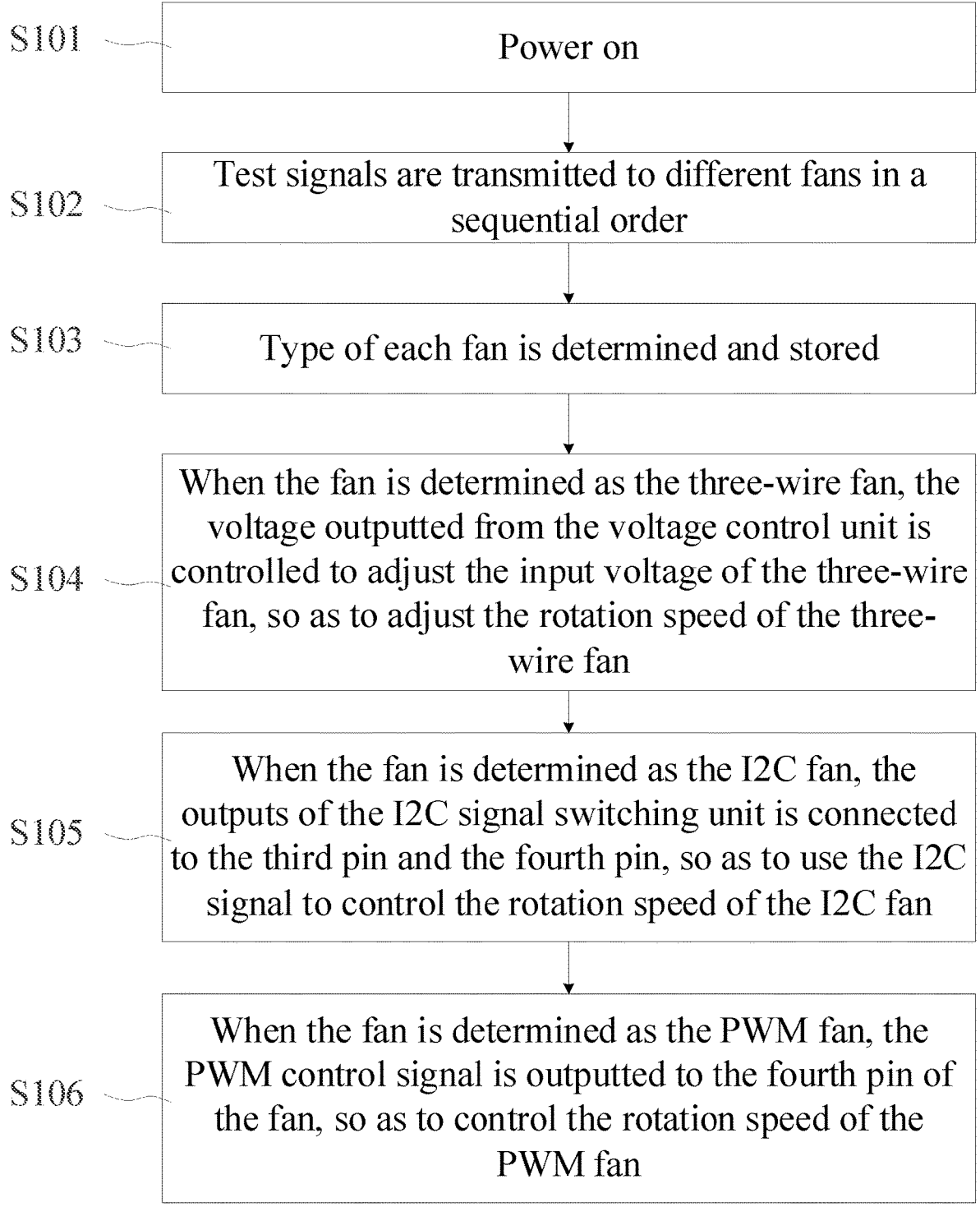
FIG. 2A is a flowchart of an operation of testing a fan type and controlling a fan, according to an embodiment of the present invention.

Please refer to FIG. 2A, which is a flowchart of an operation of testing the fan type and controlling the fan, according an embodiment of the present invention. The flowchart includes steps S101 to S106.

In the step S101, the intelligent fan control system is powered on.

In the step S102, the test signals are transmitted to different fans in a sequential order. According to above-mentioned content, the I2C signal and the PWM control signal are transmitted to the single fan in sequence, for determining the type of the fan. The determination operation is described with reference to FIGS. 2B and 2C.

In a step S103, the type of each fan is determined and stored. After the type of each fan is determined, the type of each fan is stored in the memory 12.

In the step S104, when the fan is determined as the three-wire fan, the voltage outputted from the voltage control unit is controlled to adjust the input voltage of the three-wire fan, so as to adjust the rotation speed of the three-wire fan. The operation described in the step S104 is the same as the above-mentioned control scheme of the three-wire fan.

In a step S105, when the fan is determined as the I2C fan, the outputs of the I2C signal switching unit is connected to the third pin and the fourth pin, so as to use the I2C signal to control the rotation speed of the I2C fan. The operation described in the step S105 is the same as the above-mentioned control scheme of the I2C fan.

In the step S106, when the fan is determined as the PWM fan, the PWM control signal is outputted to the fourth pin of the fan, so as to control the rotation speed of the PWM fan. The operation described in the step S106 is the same as the above-mentioned control scheme of the PWM fan.

Figure 2B:
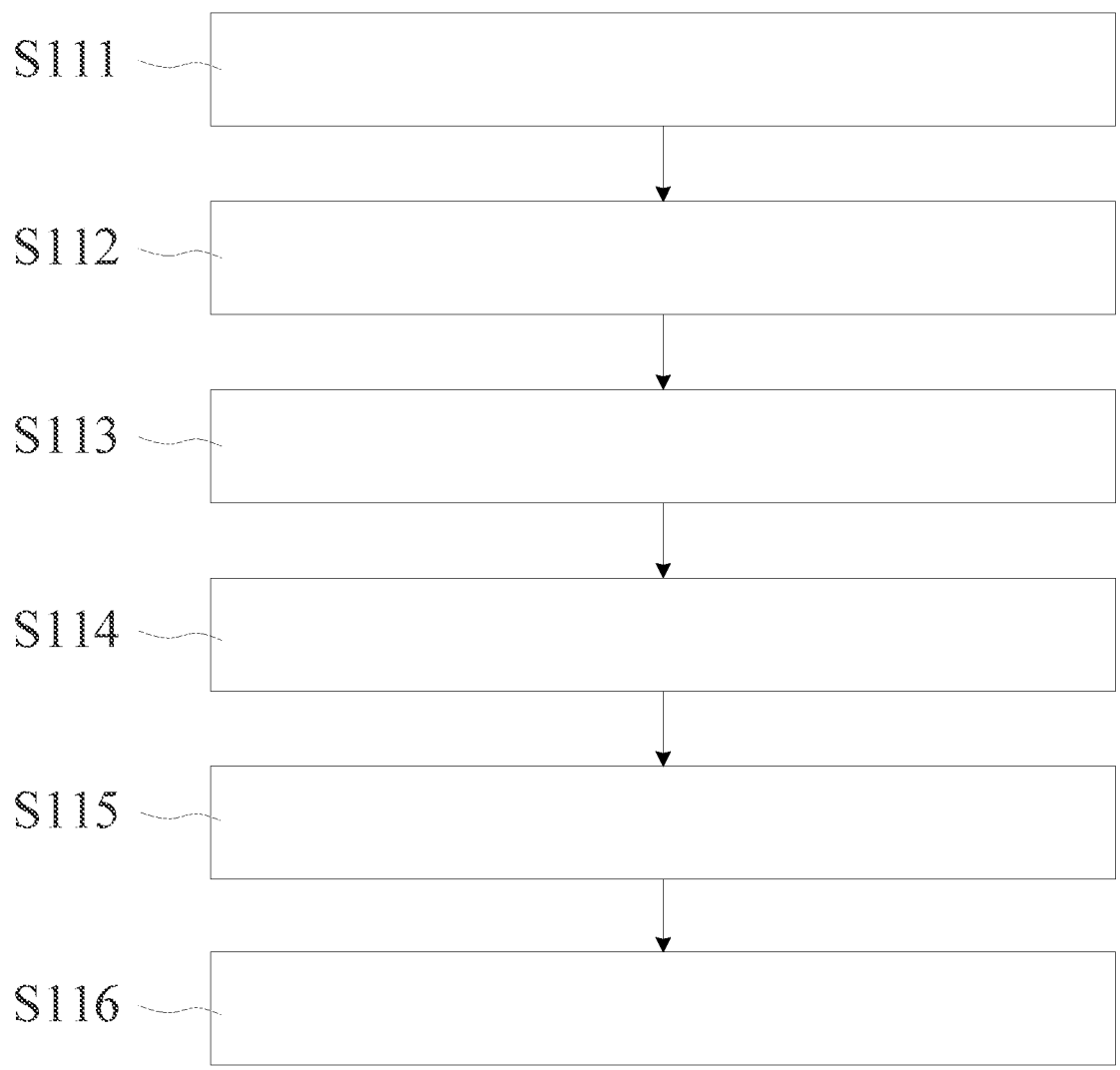
FIG. 2B is a flowchart of a fan type testing method of an intelligent fan control system with interface compatibility, according to an embodiment of the present invention.

Please refer to FIG. 2B, which is a flowchart of a fan type testing method of an intelligent fan control system with interface compatibility, according to an embodiment of the present invention. The fan type testing method includes steps S111 to S116.

In a step S111, the intelligent fan control system is powered on, and the fan type detection is executed.

In a step S112, the PWM control signal with a PWM duty cycle higher than 0% is transmitted to the fourth pin of a tested fan, and the voltage control unit corresponding to the tested fan is disabled. The tested fan is one of the fans (20-1, 20-2, 20-3 . . . 20-*n*), and only one fan is tested in a testing process. The voltage control unit is disabled to exclude the effect thereof.

In a step S113, the speed value is received from the third pin of the tested fan, and when the third pin does not transmit back the speed value, the tested fan is determined as the I2C fan or it is determined as absence of fan. For example, when the PWM control signal is transmitted to the fourth pin of the fan slot 60-1 via the fourth pin (SCL1/PWM1) of the port set 11-1, the fourth pin of the fan 20-1 should receive the PWM control signal, so when the speed value is not transmitted back, it indicates only two conditions, for example, the tested fan is the I2C fan or there is no fan connected to the fan slot 60-1. In these two conditions, there is no response of speed value; however, when the tested fan is the PWM fan or the three-wire fan, there will be a response of speed value.

In a step S114, after the tested fan is determined as the I2C fan or there is no fan connected to the fan slot, the I2C signal is transmitted to the tested fan and then the signal transmitted from the tested fan is received, and when the signal transmitted form the tested fan transmits is a correct I2C signal, the tested fan is determined as the I2C fan; when there is no I2C signal transmitted from the fan slot 60-1, it is determined as absence of fan; when the signal transmitted from the tested fan is a wrong I2C signal, an I2C fan anomaly signal is generated. According to above-mentioned content, as long as the received signal is the correct I2C signal, the tested fan is the I2C fan, and when the received signal is not the correct I2C signal, it is possible that the I2C fan is at an abnormal condition. When no I2C signal responds, it indicates absence of fan. According to the determination manner of the present invention, the special technical effect of determining the I2C fan at the abnormal condition can be achieved.

In a step S115, when the speed value is transmitted from the third pin of the tested fan, the PWM duty cycle is changed and then the speed value from the third pin of the fan is received, when the speed value transmitted from the third pin is changed and correct, the tested fan is determined as the PWM fan; when the speed value transmitted from the third pin is not changed, the tested fan is determined as the three-wire fan; when the speed value transmitted from the third pin is changed and wrong, a PWM fan anomaly signal is generated and outputted. When the speed value is transmitted from the third pin FG of the fan, it indicates the tested fan may be the PWM fan or the three-wire fan. Since the voltage control unit is disabled, when the PWM duty cycle is changed and the speed value of the tested fan is changed correspondingly, the tested fan can be determined as the PWM fan; otherwise, when the speed value is not changed, the tested fan can be determined as the three-wire fan.

In a step S116, when the tested fan is determined as the three-wire fan, the voltage control unit corresponding to the tested fan is enabled to adjust and output different output voltages to the second pin of the tested fan and then the speed value transmitted from the third pin of the tested fan is received; when the speed value is correct, the tested fan can be determined as the three-wire fan; when the speed value is not correct, a three-wire fan anomaly signal is generated and outputted.

FIG. 2B shows a flow of first testing whether the tested fan is the I2C fan and then testing whether the tested fan is the PWM fan. In another embodiment, the testing method can first test whether the tested fan is the PWM fan and then test whether the tested fan is the I2C fan.

Figure 2C:
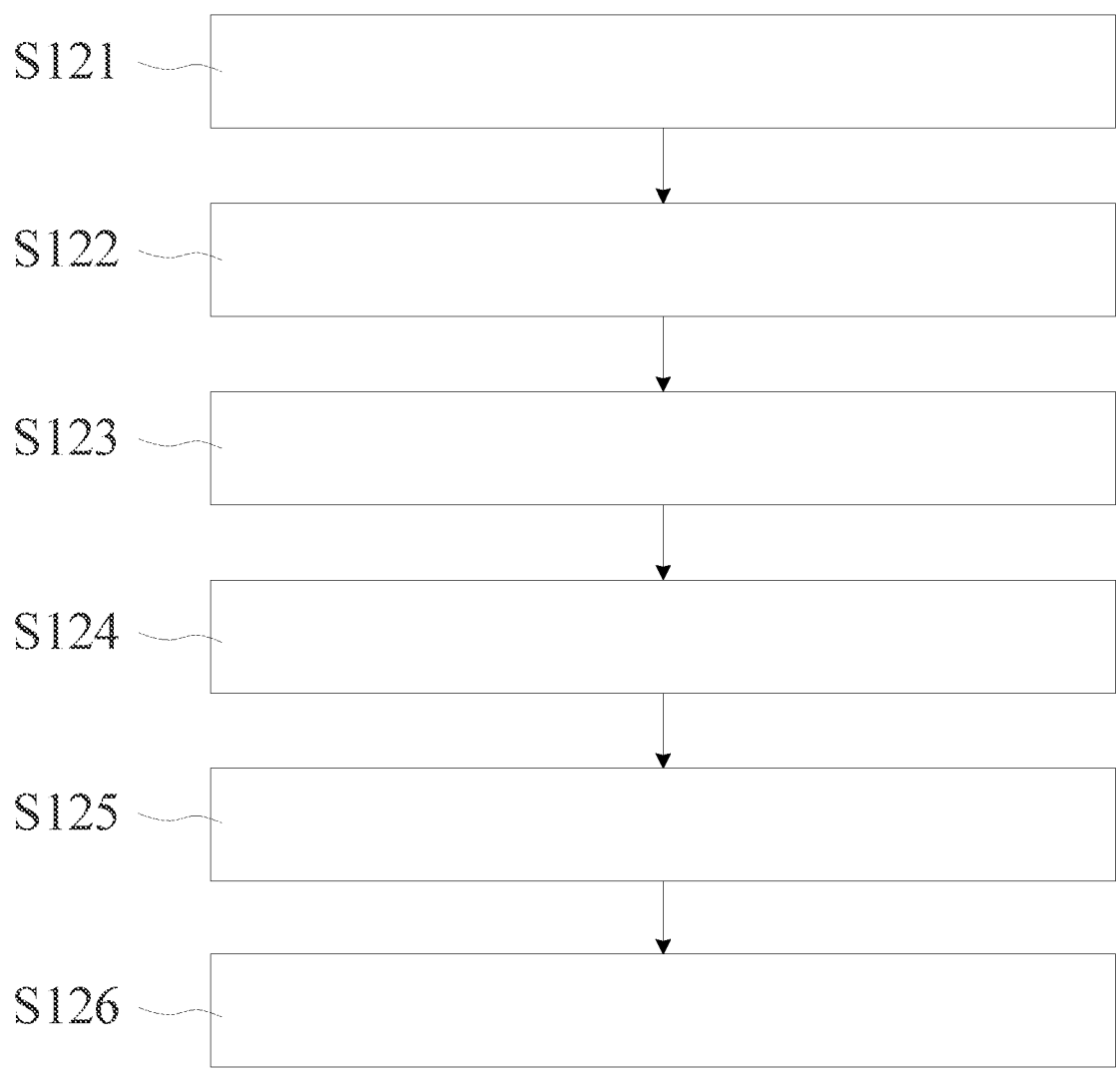
FIG. 2C is a flowchart of a fan type testing method of an intelligent fan control system with interface compatibility, according to another embodiment of the present invention.

Please refer to FIG. 2C, which is a flowchart of a fan type testing method of an intelligent fan control system with interface compatibility, according to another embodiment of the present invention. As shown in FIG. 2C, the fan type testing method includes steps S121 to S126.

In a step S121, the intelligent fan control system is powered on, and the fan type detection is executed.

In a step S122, the voltage control unit is disabled, the I2C signal is transmitted to the third pin and the fourth pin of the tested fan.

In a step S123, when the I2C signal can be transmitted back from the third pin and the fourth pin of the tested fan, the tested fan can be determined as the I2C fan, and when the received I2C signal is wrong, an I2C fan anomaly signal is generated and outputted.

In a step S124, when the I2C signal can be transmitted back from the third pin and the fourth pin of the tested fan, the PWM control signal with a PWM duty cycle higher than 0% is transmitted to the fourth pin of the tested fan, and when no speed value is transmitted from the third pin of the tested fan, it is determined as absence of fan.

In a step S125, when the speed value can be transmitted back from the third pin of the tested fan, the PWM duty cycle is changed and then the speed value transmitted from the third pin of the fan is received, when the speed value transmitted back from the third pin is changed and correct, the tested fan is determined as the PWM fan; when the speed value transmitted from the third pin is not changed, the tested fan is determined as the three-wire fan; when the speed value transmitted from the third pin is changed and wrong, a PWM fan anomaly signal is generated and outputted.

In a step S126, when the tested fan is determined as the three-wire fan, the voltage control unit corresponding to the tested fan is enabled to adjust and output different output voltage to the second pin of the tested fan, and then the speed value transmitted from the third pin of the tested fan is received, and when the received value is correct, the tested fan can be determined as the three-wire fan; when the received value is not correct, a three-wire fan anomaly signal is generated and outputted.

According to the embodiments shown in FIGS. 2B and 2C, it can find that the intelligent fan control system of the present invention can perform the same testing method for the PWM fan, the I2C fan and the three-wire fan. The test sequence can be adjusted for determination of the four fan types including the PWM fan, the I2C fan, the three-wire fan, and absence of fan. Furthermore, in the determination process, the intelligent fan control system of the present invention can determine whether the fan is at the abnormal condition, that is, the tested fan is unable to be controlled.

Figure 3:
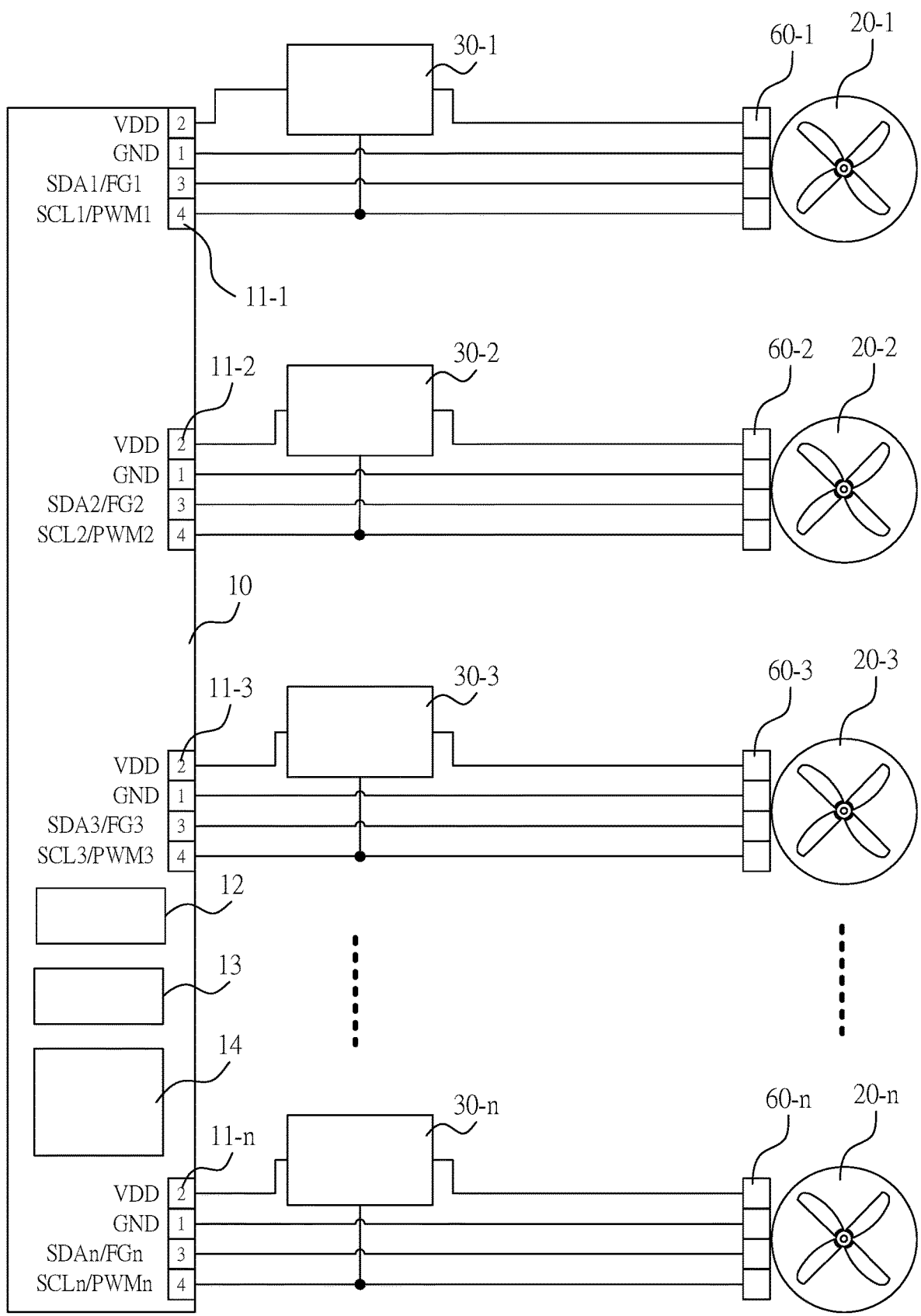
FIG. 3 is a structural diagram of an intelligent fan control system with interface compatibility, according to another embodiment of the present invention.

Please refer to FIG. 3, which is a structural diagram of an intelligent fan control system with interface compatibility, according to another embodiment of the present invention. The intelligent fan control system is able to identify and control a plurality of fans (20-1, 20-2, 20-3 . . . 20-*n*) one-to-one connected to a plurality of fan slots (60-1, 60-2, 60-3 . . . 60-*n*), and each of the plurality of fan slots comprises four pins. The intelligent fan control system of the present invention can include a plurality of connection line sets, a plurality of voltage control units (30-1, 30-2, 30-3, . . . 30-*n*), and a control board 10. The difference between embodiment of FIG. 1 and the embodiment of FIG. 3 is that the function of the I2C signal switching unit 40 of the embodiment of FIG. 3 is implemented in the control board 10, and the output/input of each of the port sets (11-1, 11-2, 11-3 . . . 11-*n*) of the control board 10 can be individually switched to be SDA/FG or SCL/PWM, so that the third pin and the fourth pin of each of the port sets (11-1, 11-2, 11-3 . . . 11-*n*) can be controlled to change to an I2C control mode or a PWM control mode. Except for omission of the bus, the remaining specific contents of the embodiment of FIG. 3 are the same as that of the embodiment of FIG. 1, so the detailed descriptions are not repeated.

Figure 4A:
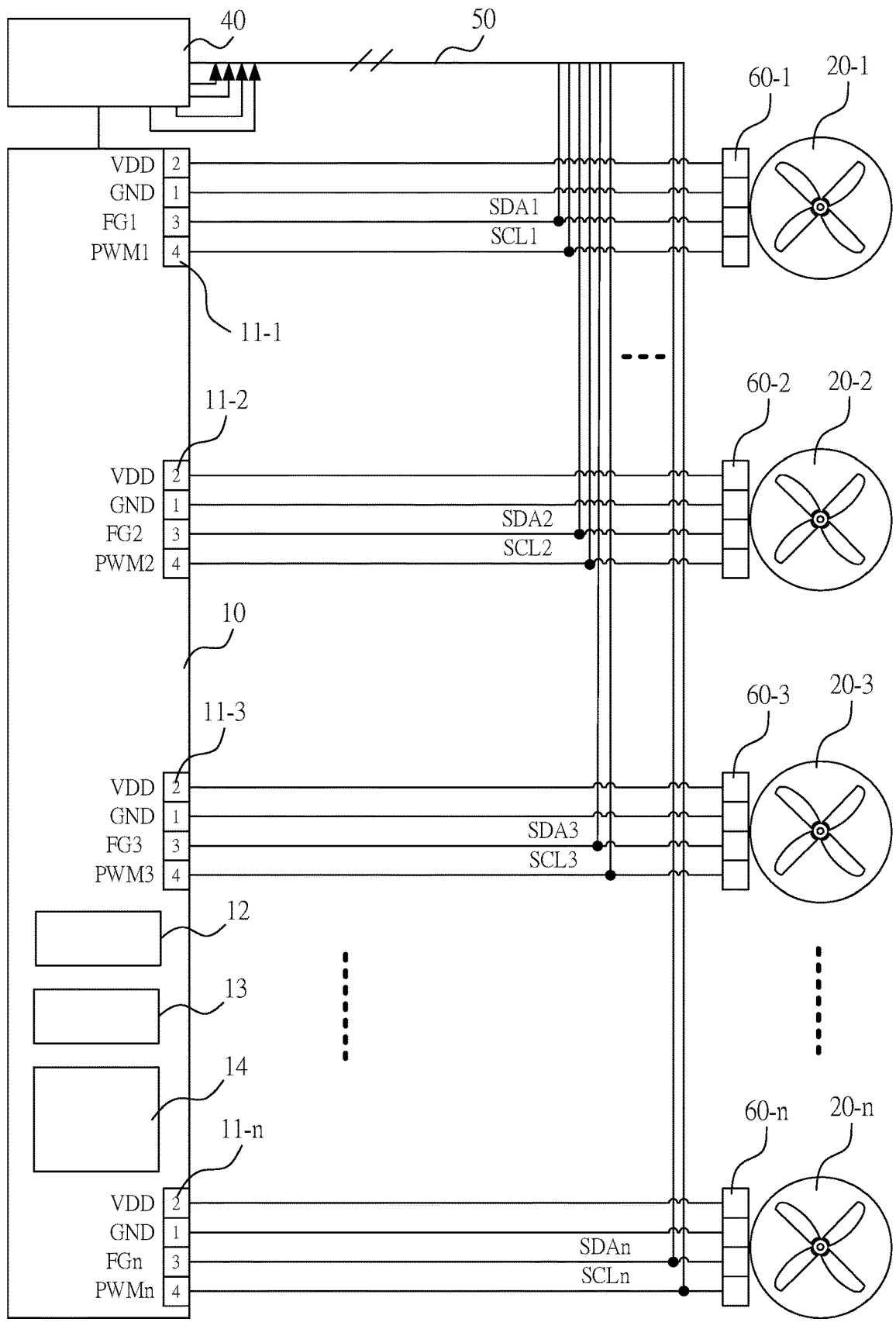
FIGS. 4A and 4B are two structural diagrams of an intelligent fan control system with interface compatibility, according to another two embodiments of the present invention.
Figure 4B:
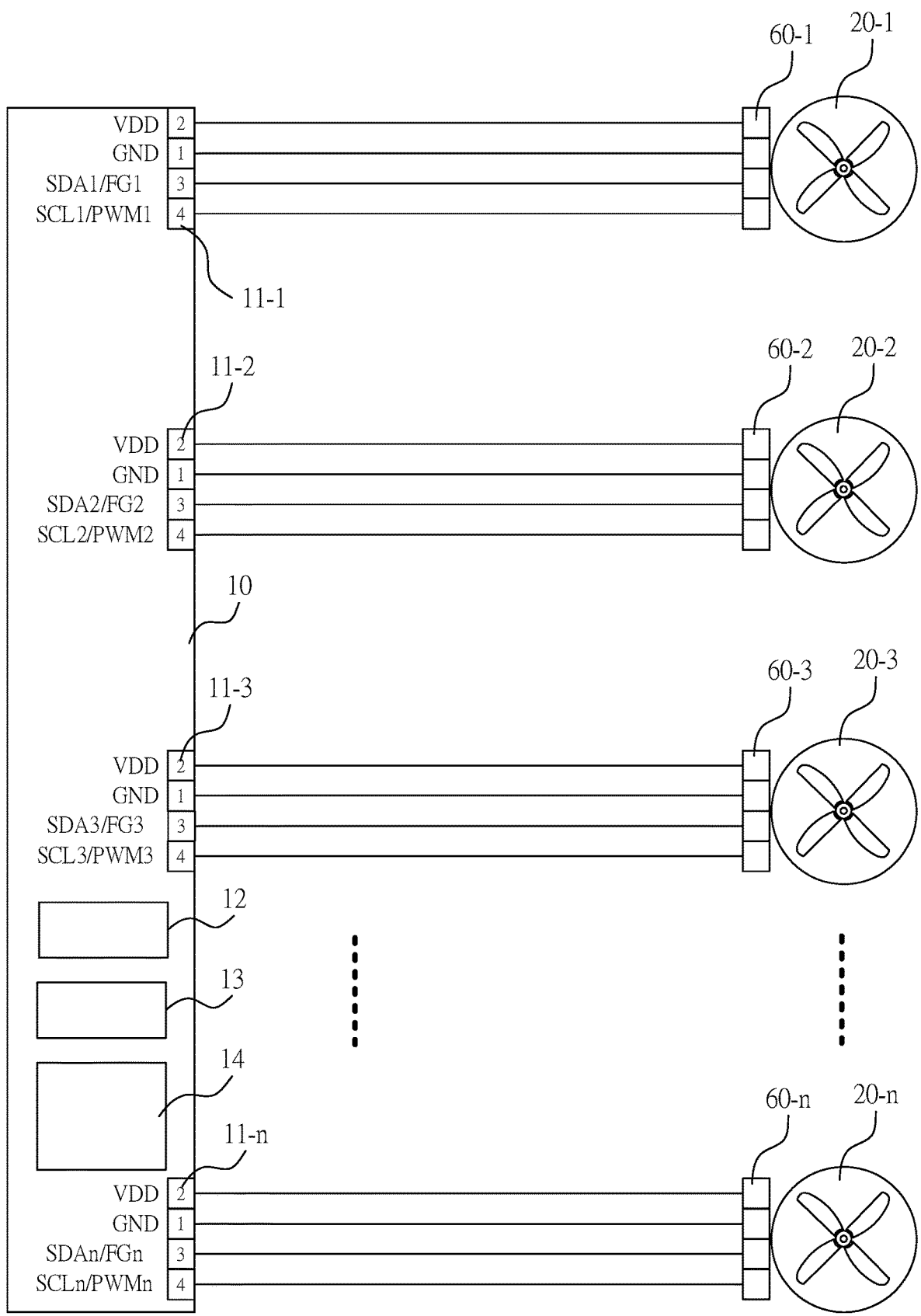

Please refer to FIGS. 4A and 4B, which show another two embodiments of the intelligent fan control system of the present invention. The two embodiments correspond to the embodiments od FIGS. 1 and 3, respectively, but omit the voltage control units (30-1, 30-2, 30-3 . . . 30-*n*), so that the two embodiments can be used for the motherboard system with the PWM fan and I2C fan only.

In the embodiment of FIG. 4B, the intelligent fan control system of the present invention is able to identify and control a plurality of fans connected to a plurality of fan slots, and each of the plurality of fan slots includes four pins. The intelligent fan control system includes a plurality of connection line sets and a control board 10. Each of the plurality of connection line sets includes four connection lines connected to one of the plurality of fan slot corresponding thereto. The control board 10 includes a microcontroller (not shown in FIG. 4B), at least one I2C unit 13, at least one PWM control signal generating unit 14, and a plurality of port sets (11-1, 11-2, 11-3, . . . 11-*n*). Each of the plurality of port sets includes four pins and is connected to one of the plurality of connection line set corresponding thereto, and one of the fan slot sets (60-1, 60-2, 60-3 . . . 60-*n*)

corresponding thereto. The control board 10 can define a third pin of each of the port sets as SDA/FG, and define a fourth pin of each of the port sets as SCL/PWM. The control board 10 can control operations of the at least one I2C unit 13 and the at least one PWM control signal generating unit 14 according to the fan type testing method and the fan type record table, so as to switch the I/O status of each of port sets to the I2C control mode or the PWM control mode. When the port set is in the I2C control mode, the control board 10 switches the third pin of the port set to SDA, and the fourth pin of the port set to SCL, and blocks the input/output of the at least one PWM control signal generating unit 14 to the fourth pin of the port set. When the port set is in the PWM control mode, the control board 10 switches the third pin of the port set to be defined as FG, and the fourth pin of the port set to be defined as PWM, and the control board 10 blocks the input/output of the at least one I2C unit 13 to the third pin and the fourth pin of the port set. The fan type record table is stored in the memory 12 and records whether each of the fans is the PWM fan or the I2C fan.

Compared with the embodiment of FIG. 4B, the embodiment of FIG. 4A just adds the I2C signal switching unit 40; in other words, the I2C switching function is implemented by other unit outside of the control board 10.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. An intelligent fan control system with interface compatibility, configured to identify and control a plurality of fans connected to a plurality of fan slots, and each of the plurality of fan slots comprising four pins, and the intelligent fan control system comprising:
   a bus;
   an I2C signal switching unit comprising a plurality of SDA outputs one-to-one connected to third pins of the plurality of fan slots via the bus, and a plurality of SCL outputs one-to-one connected to fourth pins of the plurality of fan slots via the bus;
   a plurality of voltage control units one-to-one corresponding to the plurality of fan slots, wherein an output terminal of each of the plurality of voltage control units is connected to a second pin of one of the plurality of fan slots corresponding thereto;
   a plurality of connection line sets, wherein each of the plurality of connection line sets comprises four connection lines and connected to one of the plurality of fan slots corresponding thereto, and each of the plurality of connection line sets comprises a second line connected to an input terminal of one of the plurality of voltage controlled units corresponding thereto, and a fourth line connected to one of the plurality of voltage control units corresponding thereto; and
   a control board comprising a plurality of port sets, wherein each of the plurality of port sets comprises four pins and is connected to one of the plurality of connection line set corresponding thereto and one of the plurality of voltage control units corresponding thereto, and the control board is connected to the I2C signal switching unit and configured to transmit an I2C signal to control the I2C signal switching unit to switch to one of the plurality of fan slots via the bus in a sequential order, and the control board then transmits an I2C signal to the one of plurality of fan slots to which the I2C signal switching unit is switched;

wherein the control board controls the plurality of fans according to a fan type record table stored in a memory, and when one of the plurality of fans is a three-wire fan, the control board enables the corresponding one of the plurality of voltage control units and transmits a PWM control signal generated by the control board, via the fourth line of the corresponding connection line set, to control an output voltage of the corresponding voltage control unit, so as to adjust a rotation speed of the three-wire fan.

2. The intelligent fan control system according to claim 1, wherein when one of the plurality of fans is a PWM fan or an I2C fan, the control board disables the corresponding voltage control unit.

3. The intelligent fan control system according to claim 2, wherein when the fan is the PWM fan, the control board blocks outputs of the I2C signal switching unit to the third pin and the fourth pin of the PWM fan, and outputs the PWM control signal to the fourth pin of the PWM fan.

4. The intelligent fan control system according to claim 1, wherein when the fan is the I2C fan, the control board blocks the output of the PWM control signal to the fourth pin of the I2C fan, and enables the output of the I2C signal switching unit to the third pin and the fourth pin of the I2C fan.

5. The intelligent fan control system according to claim 1, wherein the memory is disposed in the control board.

6. The intelligent fan control system according to claim 1, wherein the plurality of connection line sets are manufactured by cables or circuit boards.

7. The intelligent fan control system according to claim 1, wherein after the control board determines types of the plurality of fans according to a fan type testing method, a fan type record table is created and stored in the memory, and the fan type testing method comprises:
   transmitting the PWM control signal with a duty cycle higher than 0%, to the fourth pin of the fan to be determined;
   receiving a speed value from a third pin of the fan to be determined, when the speed value is not received from the third pin of the fan to be determined, determining the fan as an I2C fan or determining absence of fan;
   after the fan is determined as the I2C fan or it is determined absence of fan, transmitting an I2C signal to the fan and then reading a signal transmitted from the fan, and when the I2C signal transmitted from the fan is correct, determining the fan as the I2C fan, and when no I2C signal is received, determining absence of fan; and
   when the third pin of the fan transmits back the speed value, changing the duty cycle of the PWM control signal and then receiving the speed value transmitted from the third pin of the fan;
   when the speed value transmitted from the third pin of the fan is changed and correct, determining the fan as the PWM fan, and when the speed value transmitted from the third pin of the fan is not changed, determining the fan as a three-wire fan.

8. The intelligent fan control system according to claim 7, further comprising:
   when the fan is determined as the three-wire fan, enabling the voltage control unit corresponding to the fan, and transmitting the PWM control signal corresponding to the enabled voltage control unit, so as to adjust and output different output voltage to the second pin of the fan; and
   receiving the speed value transmitted from the third pin of the fan; and determining the fan as the three-wire fan when the speed value is correct.

9. The intelligent fan control system according to claim 1, wherein after types of the plurality of fans are determined according to a fan type testing method, the control board creates and stores the fan type record table in the memory, and the fan type testing method comprises:
   transmitting an I2C signal to the third pin and the fourth pin of the fan;
   determining the fan as an I2C fan when the third pin and the fourth pin of the fan transmit back the I2C signal;
   when the third pin and the fourth pin of the fan does not transmit back the I2C signal, transmitting the PWM control signal with a duty cycle higher than 0%, to the fourth pin of the fan;
   when the third pin of the fan does not transmit back a speed value, determining absence of fan; and
   when the third pin of the fan transmits back the speed value, changing the duty cycle of the PWM control signal and then receiving the speed value transmitted from the third pin of the fan, and when the speed value transmitted from the third pin of the fan is changed and correct, determining the fan as a PWM fan, and when the speed value transmitted from the third pin of the fan is not changed, determining the fan as a three-wire fan.

10. The intelligent fan control system according to claim 9, further comprising:
   when the fan is determined as the three-wire fan, enabling the voltage control unit corresponding to the fan and transmitting the PWM control signal corresponding to the enabled voltage control unit, to adjust and output different output voltage to the second pin of the fan;
   receiving the speed value transmitted from the third pin of the fan; and
   determining the fan as the three-wire fan when the speed value is correct.

11. An intelligent fan control system with interface compatibility, configured to identify and control a plurality of fans connected to a plurality of fan slots, each of the plurality of fan slots comprising the four pins, and the intelligent fan control system comprising:
   a bus;
   an I2C signal switching unit comprising a plurality of SDA outputs one-to-one connected to third pins of the plurality of fan slots via the bus, and a plurality of SCL outputs one-to-one connected to fourth pins of the plurality of fan slots via the bus;
   a plurality of connection line sets, wherein each of the plurality of connection line sets comprises four connection lines and connected to one of the plurality of fan slots corresponding thereto; and
   a control board comprising a plurality of port sets, wherein each of the plurality of port sets comprises four pins and connected to one of the plurality of connection line sets corresponding thereto, and one of the plurality of fan slot sets corresponding thereto, wherein the control board is connected to the I2C signal switching unit and configured to transmit an I2C signal to control the I2C signal switching unit to switch to one of the plurality of fan slots in a sequential order via the bus, and then the control board transmits an I2C signal to the one of plurality of fan slots to which the I2C signal switching unit is switched;
   wherein the control board controls the plurality of fans according to a fan type record table stored in a memory.

12. The intelligent fan control system according to claim 11, wherein when the fan is a PWM fan, the control board blocks the outputs of the I2C signal switching unit to the third pin and the fourth pin of the PWM fan, and enables to output a PWM control signal to the fourth pin of the PWM fan.

13. The intelligent fan control system according to claim 11, wherein when the fan is an I2C fan, the control board blocks output of the PWM control signal to the fourth pin of the I2C fan, and enables the outputs of the I2C signal switching unit to the third pin and the fourth pin of the I2C fan.

14. The intelligent fan control system according to claim 11, wherein the memory is disposed in the control board.

15. The intelligent fan control system according to claim 11, wherein the plurality of connection line sets are manufactured by cables or circuit boards.

16. The intelligent fan control system according to claim 11, wherein after the control board determines types of the plurality of fans according to a fan type testing method, the fan type record table is created and stored in the memory, and the fan type testing method comprises:
   transmitting a PWM control signal with a duty cycle higher than 0%, to the fourth pin of the fan to be determined;
   receiving a speed value from a third pin of the fan to be determined, when no speed value is transmitted from the third pin of the fan to be determined, determining the fan as an I2C fan or determining absence of fan;
   after the fan is determined as the I2C fan or it is determined as absence of fan, transmitting an I2C signal to the fan and then reading a signal transmitted from the fan, and when the I2C signal transmitted from the fan is correct, determining the fan as the I2C fan, and when no I2C signal is received, determining absence of fan; and
   when the third pin of the fan transmits back the speed value, changing the duty cycle of the PWM control signal and then receiving the speed value transmitted from the third pin of the fan, and when the speed value transmitted from the third pin of the fan is changed and correct, determining the fan as a PWM fan.

17. The intelligent fan control system according to claim 11, wherein after types of the plurality of fans are determined according to a fan type testing method, the control board creates and stores the fan type record table in the memory, and the fan type testing method comprises:
   transmitting an I2C signal to a third pin and a fourth pin of the fan to be determined;
   when the I2C signal is transmitted back from the third pin and the fourth pin of the fan to be determined, determining the fan as an I2C fan;
   when no I2C signal is transmitted back from the third pin and the fourth pin of the fan to be determined, transmitting a PWM control signal with a duty cycle higher than 0%, to the fourth pin of the fan;
   when no speed value is transmitted back from the third pin of the fan to be determined, determining absence of fan; and
   when a speed value is transmitted back from the third pin of the fan to be determined, changing the duty cycle of the PWM control signal and then receiving the speed value transmitted from the third pin of the fan to be determined, and when the speed value transmitted from the third pin of the fan is changed and correct, determining the fan as a PWM fan.

18. An intelligent fan control system with interface compatibility, configured to identify and control a plurality of fans connected to a plurality of fan slots, each of the plurality of fan slots comprising four pins, and intelligent fan control system comprising:
- a plurality of connection line sets, wherein each of the plurality of connection line sets comprises four connection lines and connected to one of the plurality of fan slots corresponding thereto; and
- a control board comprising a microcontroller, at least one I2C unit, at least one PWM control signal generating unit, and a plurality of port sets, wherein each of the plurality of port sets comprises four pins and is connected to one of the plurality of connection line set corresponding thereto and one of the plurality of voltage control units corresponding thereto, and the control board defines a third pin of each of the plurality of port sets as SDA/FG, and defines a fourth pin of each of the plurality of port sets as SCL/PWM, and the control board controls operations of the at least one I2C unit and the at least one PWM control signal generating unit according to a fan type testing method and a fan type record table, so as to switch an I/O status of each of the plurality of port sets to an I2C control mode or a PWM control mode;
- when one of the plurality of port sets is in the I2C control mode, the control board switches the third pin and the fourth pin of the one of the plurality of port sets to be SDA and SCL, respectively, and blocks input/output of the at least one PWM control signal generating unit to the fourth pin of the one of the plurality of port sets; and
- when one of the plurality of port sets is in the PWM control mode, the control board switches the third pin and the four pin of the one of the plurality of port sets to be FG and PWM, and blocks input/output of the at least one I2C unit to the third pin and the fourth pin of the one of the plurality of port sets;
- wherein the fan type record table is stored in the memory and configured to record whether each of the plurality of fans is a PWM fan or an I2C fan.

19. The intelligent fan control system according to claim 18, wherein the number of the at least one I2C unit is one, and the control board further comprises:
- an I2C signal switching unit comprising a plurality of SDA outputs one-to-one connected to third pins of the plurality of fan slots, and a plurality of SCL outputs one-to-one connected to fourth pins of the plurality of fan slots;
- wherein the microcontroller of the control board is connected to the I2C unit and the I2C signal switching unit, and configured to switch the I2C signal generated or received by the I2C unit, to one of the plurality of fan slots corresponding thereto, via the I2C signal switching unit.

20. The intelligent fan control system according to claim 18, wherein the number of the at least one I2C unit are multiple and corresponding to the number of the plurality of port sets, and the plurality of I2C units are connected to the third pins and fourth pins of the plurality of port sets, in one-to-one correspondence.

21. The intelligent fan control system according to claim 18, wherein the memory is disposed in the control board.

22. The intelligent fan control system according to claim 18, wherein the plurality of connection line sets are manufactured by cables or circuit boards.

23. The intelligent fan control system according to claim 18, wherein after types of the plurality of fans are determined according to a fan type testing method, the control board creates and stores the fan type record table in the memory, and the fan type testing method comprises:
- transmitting a PWM control signal with a duty cycle higher than 0%, to the fourth pin of the fan to be determined;
- receiving a speed value from a third pin of the fan to be determined, and when no speed value is transmitted back from the third pin of the fan to be determined, determining the fan as an I2C fan or determining absence of fan;
- after the fan is determined as the I2C fan or it is determined as absence of fan, transmitting an I2C signal to the fan and then receiving the I2C signal transmitted from the fan, and when the I2C signal transmitted from the fan is correct, determining the fan as the I2C fan;
- when no I2C signal is received, determining absence of fan; and
- when the third pin of the fan transmits back the speed value, changing the duty cycle of the PWM control signal and then receiving the speed value transmitted from the third pin of the fan, and when the speed value transmitted from the third pin of the fan is changed and correct, determining the fan as a PWM fan.

24. The intelligent fan control system according to claim 18, wherein after types of the plurality of fans are determined according to a fan type testing method, the control board creates and stores the fan type record table in the memory, and the fan type testing method comprises:
- transmitting an I2C signal to the third pin and the fourth pin of the fan to be determined;
- when the I2C signal is transmitted back from the third pin and the fourth pin of the fan to be determined, determining the fan as an I2C fan;
- when no I2C signal is transmitted back from the third pin and the fourth pin of the fan to be determined, transmitting a PWM control signal with a duty cycle higher than 0%, to the fourth pin of the fan to be determined;
- when no speed value is transmitted back from the third pin of the fan to be determined, determining absence of fan; and
- when a speed value is transmitted back from the third pin of the fan to be determined, changing the duty cycle of the PWM control signal and then receiving the speed value transmitted from the third pin of the fan to be determined, and when the speed value transmitted from the third pin of the fan to be determined is changed and correct, determining the fan as a PWM fan.

25. The intelligent fan control system according to claim 18, further comprising
- a plurality of voltage control units corresponding to the plurality of fan slots in one-to-one correspondence, wherein an output terminal of each of the plurality of voltage control units is connected to a second pin of one of the plurality of fan slots corresponding thereto;
- wherein a second line of each of the plurality of connection line sets is connected to an input terminal of one of the plurality of voltage controlled units corresponding thereto, and a fourth line of each of the plurality of connection line sets is connected to one of the plurality of voltage control units corresponding thereto;
- when the fan is a three-wire fan, the control board enables one of the plurality of voltage control units corresponding to the three-wire fan, and transmits a PWM control signal generated by the control board, via the fourth line of the corresponding connection line set, to control an output voltage of the corresponding voltage control unit, so as to adjust a rotation speed of the three-wire fan.

\* \* \* \* \*